J. M. SPITZGLASS.
CALCULATING DEVICE.
APPLICATION FILED JULY 1, 1914.
1,145,042.
Patented July 6, 1915.
2 SHEETS—SHEET 1.
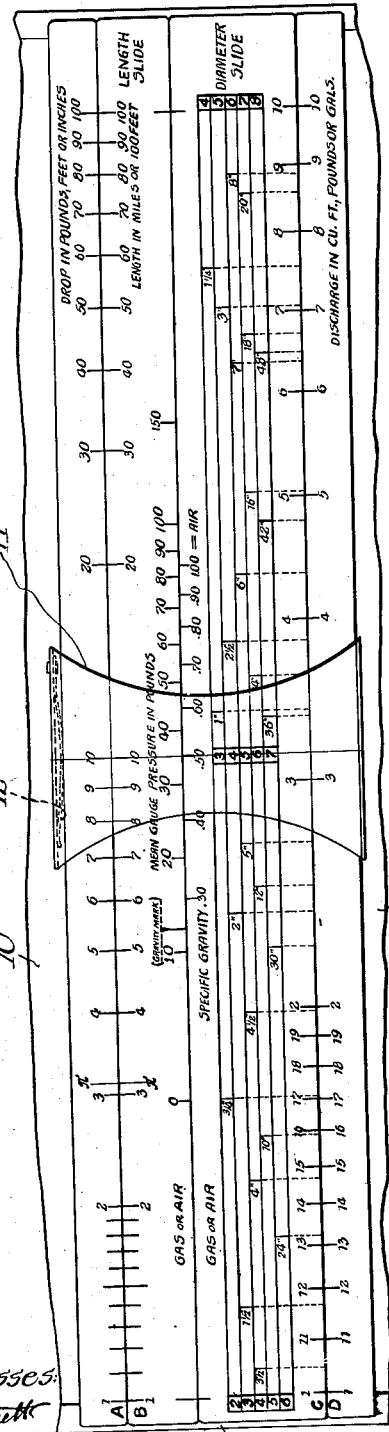
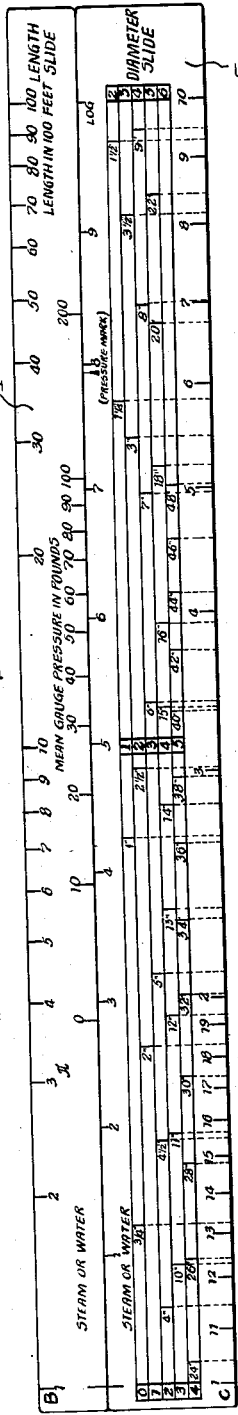
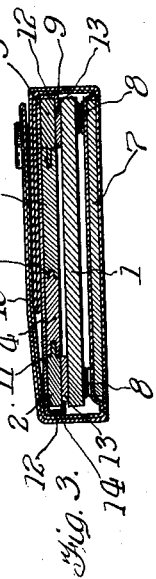
Witnesses:
Inventor:
Jacob M. Spitzglass,
By Brown, Nissen & Sprinkle
Attys.

J. M. SPITZGLASS.
CALCULATING DEVICE.
APPLICATION FILED JULY 1, 1914.
1,145,042.
Patented July 6, 1915.
2 SHEETS—SHEET 2.
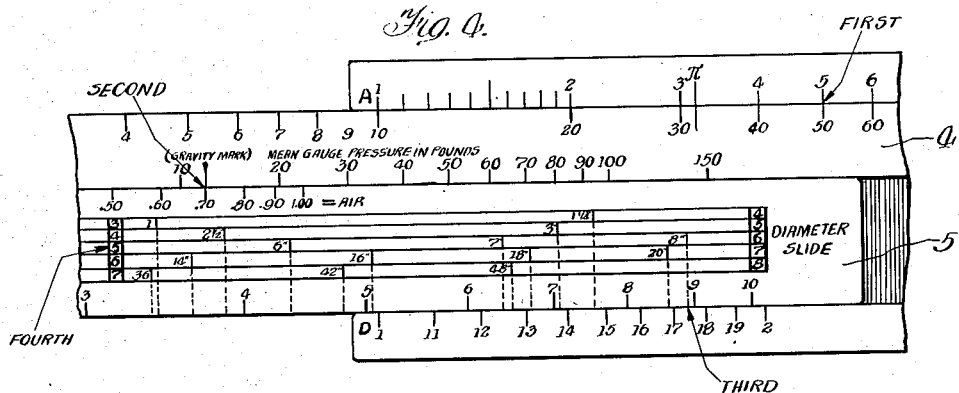
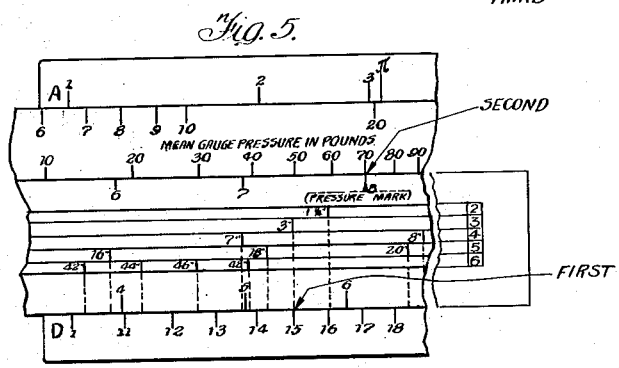
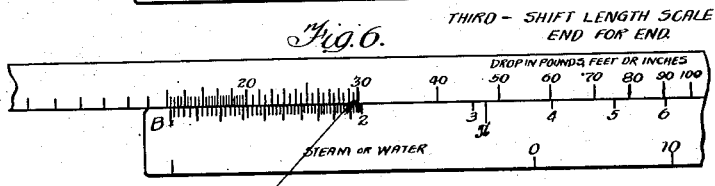
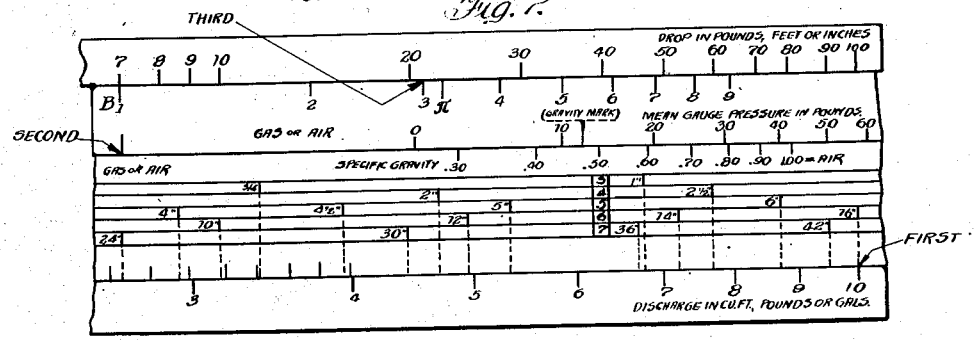
Witnesses:
H. C. Barrett
A. J. Sauser
Inventor:
Jacob M. Spitzglass,
By Brown, Nissen & Sprinkle
Attys.

UNITED STATES PATENT OFFICE.

JACOB M. SPITZGLASS, OF CHICAGO, ILLINOIS.

CALCULATING DEVICE.

1,145,042.  Specification of Letters Patent.  Patented July 6, 1915.

Application filed July 1, 1914. Serial No. 848,342.

*To all whom it may concern:*

Be it known that I, JACOB M. SPITZGLASS, a citizen of the United States, residing at Chicago, in the county of Cook and State of Illinois, have invented certain new and useful Improvements in Calculating Devices, of which the following is a specification.

This invention relates to a numerical calculating device and is more particularly described as a slide rule and flow computer.

The principal object of the invention is to provide a device of this class for the direct solution of problems involving the flow of gas, air, steam, or water or other fluids in circular pipes, in addition to all ordinary slide rule computations.

A further object of the invention is to provide means by which the required answers may be read from the scales directly, with the accuracy and precision of the ordinary slide rule and without the necessity of manipulating the decimal point or the number of integer places in the answer.

For the attainment of these ends and the accomplishment of other new and useful objects, as will appear, the invention consists in the features of novelty in the construction, combination and arrangement of the several parts generally shown in the accompanying drawings and described in the specification, but more particularly pointed out in the appended claims.

In the drawings, Figure 1 is a view of a slide rule constructed in accordance with the principles of my invention, to which a case is attached, the flaps of the case, however, being broken away for clearness; Fig. 2 is a view of the reverse side of the movable slides; Fig. 3 is a sectional view of the rule showing the flaps of the casing in folded position, and Figs. 4, 5, 6 and 7 illustrate the settings of the slides in the solution of certain problems.

In construction the slide rule is made of some suitable material, such for example as celluloid, and comprises a base 1, to which are secured at the sides the tongued strips 2 and 3, which bear the graduated scales designated on the faces thereof as A and D respectively. Situated between the side pieces are the graduated slides 4 and 5, one of which, as for example the slide 4, is provided with a tongue 6 having less frictional resistance either because of its smaller size than the tongues on the strips 2 and 3, or because it fits more loosely, which connects the two slides together so that they may be moved relatively to each other and also independently moved relative to the scales A and D. The slide 4 will be designated and referred to as the length slide, and has a scale B corresponding to the scale A on one edge, and a pressure scale for gas or air on the other edge of the same face. The opposite face of the length slide is provided with another scale B and with a steam or water pressure graduation.

The slide 5, which will be referred to as the diameter slide, comprises on one face a graduated edge for specific gravity for gas or air graduations, as shown in Fig. 1, and on the same face a number of horizontal rows upon which diameters are marked corresponding with the several graduated rows, with a dotted line for each diameter extended over to the scale C which meets and indicates corresponding readings on the D scale. These diameter lines are marked in order from three-fourths of an inch size to a forty-eight inch pipe. One column of heavy type figures in the middle of the slide and one column at each end thereof indicate the number of integer places in the numerical discharge corresponding to the diameters of each horizontal row. The reverse of the diameter slide is provided with a graduation consisting of a logarithmic scale on one side, as shown in Fig. 2, and with a graduated diameter slide with a scale C for steam or water calculations, as shown in Fig. 2. This diameter scale is also provided with a column of heavy type figures in the middle of the slide and another column at each end thereof to indicate the number of integer places in a discharge corresponding to the diameters of each horizontal row.

It is to be noted especially that the usefulness of the slide rule is greatly increased by the correlation and fitting together under the general graduations of the ordinary Mannheim rule a large number of special determinations each and every one of those having a field of application in the engineering profession, having in the same time the major scales of the rule in their usual form so that the rule can also be used for all ordinary mathematical calculations as the Mannheim slide rule.

The layout of the graduations and the arrangement of the scale to attain the desired end will be explained by referring to the following formulas representing the results obtained from experimental data as applied to the theoretical determination of the laws governing the frictional resistance of the flow of fluids in pipes.

In a technical paper "Flow of Gas Formulæ" published in the 1912 proceedings of the Illinois Gas Association the applicant showed that in the case of gases flowing in a pipe under pressure higher than atmospheric the quantity flowing through the pipe can be expressed by the formula.

$$Q = 64.3 \left( \frac{PAd^5}{SL(1+\frac{3.6}{d}+0.03d)} \right)^{1/2} \quad \text{Equation (1)}$$

In which formula Q is the number of standard cubic feet of the gas flowing through the pipe per hour; P is the drop of pressure in pounds per square inch caused by the frictional resistance in the line: L is the length of the line in miles: A is the mean pressure in the line pounds absolute: $d$ is the inside diameter of the pipe in inches, and S is the density of the gas as referred to air.

For the purpose of adopting the scales of the rule to solve the equation mechanically transpose the terms of Equation (1) to take the following shape.

$$\frac{P^{1/2}}{L^{1/2}} \times \frac{A^{1/2}}{S^{1/2}} = \frac{Q}{64.3 d^{5/2} \div (1+\frac{3.6}{d}+0.03d)^{1/2}} \quad \text{Equation (2)}$$

This can be simplified still further by replacing the denominator of the second term by the letter K and we have $$K = 64.3 d^{5/2} \div (1+\frac{3.6}{d}+0.03d)^{1/2} \quad \text{Equation (3)}$$

and Equation (2) takes the form of $$\frac{P^{1/2}}{L^{1/2}} \times \frac{A^{1/2}}{S^{1/2}} = \frac{Q}{K} \quad \text{Equation (4)}$$

Reducing Equation (4) to logarithms we have $$1/2 \log. P - 1/2 \log. L + 1/2 \log. A - 1/2 \log. S + \log. K - \log. Q = 0 \quad \text{Equation (5)}$$

It is obvious that in order to solve Equation (5) mechanically we need six scales laid out logarithmically to a given base. That is the division on the scales in inches should be equal proportionally to the logarithmic of the quantities represented by those divisions. In laying out logarithmic scales it is necessary to adapt a base for the scale, that is the length of scale which is to represent unity of the logarithm. In this case a 5 inch base is adapted for the four quantities P, L, A, and S, and a 10 inch base for the two quantities Q and K, in order to make the logarithms of the former quantities occupy one half of the space which is to be occupied by the logarithms of the latter quantities as indicated by Equation (5). Accordingly the scales were laid out for the quantities in order from top to bottom. The top scale represents the quantity P, from 1 or zero logarithm to 100 or 2 units in logarithm which is 10 inches on a 5 inch base. The second scale represents the quantity L from 1 to 100, in the same manner. For the quantity A, which is represented by the third or mean gage pressure scale, it was preferred to omit the atmospheric measure and mark off the numbers from zero to 150 pounds gage. In this scale, therefore, what is marked zero represents 14.7 which is the atmospheric pressure, 1 represents 15.7, 2 represents 16.7 and so on to the end or 150 which represents 164.7. The zero mark on this scale is taken at an arbitrary point to leave the same vacant space in front of zero and beyond 150 for improving the appearance. The fourth scale representing the quantity S, begins with the logarithm of 30 and ends with the logarithm of 100 placed in the middle of the available space the same as the scale for the quantity A. For the other two quantities K and Q the base of the logarithms is changed to 10 inches. At first it is necessary to compute the actual value of K for each nominal size diameter of pipe, or rather to find the logarithm of that quantity which has to represent the given diameter. By Equation (3) we solve the value of the log. K for each size of diameter we want to represent on the scale. Beginning with a 3/4 inch nominal size the actual dimension of the diameter is 0.824 inches, and from Equation (3);

$$\text{Log. } K = \log. 64.3 + \frac{5}{2} \log. 0.824 - \frac{1}{2} \log. (1+\frac{3.6}{0.824}+0.03 \times 0.824) = 1.2323.$$

For a 1 inch nominal size log. K is equal to 1.5344; 1¼ inch nominal size log K= 1.8758; 1½ inch log K=2.0671; for a 48 inch diameter, log K=5.8113. As the base of the scale has to be 10 inches it is obvious that in order to cover the sizes from 3/4 inch to 48 inches we need an extension of 50 inches to represent 5 units in logarithms. This was eliminated by extending the scale of K representing the diameters over 5 horizontal rows, the first or top row representing the unit of logarithms from 1 to 2, the second from 2 to 3, the third from 3 to 4, the fourth from 4 to 5, the fifth from 5 to 6.

From Equation (4) we see that Q is always in proportion with K, which would necessitate a 50 inch extension or a 5 row scale for Q the same as for K. It was more advantageous to avail this and to lay out a single unit logarithm scale of 10 inches for Q representing the numbers from 1 to 10, and since Q follows K in the same proportion a column of heavy type figures were placed on the diameter or K scale to indicate the order of Q or the number of integer places corresponding to the row where the given diameter is located on the K scale. The number of the heavy type columns showing the integer places in the quantity are determined from Equations (4) and (5) by a single solution in the usual algebraic way. For instance, substitute in Equation (5):

$P=100$; $L=100$; $A=100$; $S=1.00$, which values represent all the scales set in line (100 on the mean gage pressure scale being equal to 85.3) and we have:

1/2 log. 100—1/2 log. 100+1/2 log. 100—1/2 log. 1.00+log. K—log. Q=0 or 1—1+1—0+log. K—log. Q=0, from which log. Q=log. K+1.

Therefore, the number of integer places in Q is one more than the number of integer places in K. In the first row the values of K are between 10 and 100, and the values of Q, between 100 and 1000 which is indicated by the figure 3 in the heavy type column in the middle of the diameter slide. In the second column the number is increased to 4; and the third to 5 and so on. This column of heavy type figures placed in the middle of the diameter slide, covering the 5 rows of diameters, indicates the integer places in the quantity when the respective scales meet after the setting of the first 4 scales or the adjustment of P to L and A to S. It happens sometimes that after the first two settings the required diameter is projecting over the scale of the quantity either to the left or to the right. In such a case the slide has to be shifted a full scale or one unit logarithm, either to the right or to the left. This shifting does not change the absolute value of the number, but it multiplies by 10 when shifted to the right and divides by 10 when shifted to the left. To take care of such cases one heavy type column of figures is placed on each end of the diameter slide, the left column to be used when the scale is shifted to the right and the right column to be used when the scale is shifted to the left, in each case the difference from the center column being one unit of logarithm or one integer place. It is obvious and well known to those acquainted with the laws of logarithms that with such an arrangement of scales any time L is set opposite P, and S opposite A, then K and Q must meet in the proper relation established by the solution of Equation (1). Similarly if K is set to Q and A to S then P and L must meet in the proper relation.

It was desired to adopt the same set of scales for problems involving flow of gas or air in pipes at pressures close to atmospheric conditions. In such problems the mean pressure in the pipe is considered a constant quantity which is included in the numerical co-efficient, and the equation is reduced by algebraic transportation to the form of $$Q = 340\left(\frac{Hd^5}{S.L.(1+\frac{3.6}{d}+0.03d)}\right)^{1/2} \quad (6)$$

Where Q is the quantity of gas in cubic feet per hour; H is the drop of pressure in the line in inches of water; $d$ is the diameter of the pipe in inches; S is the density of the gas as referred to air; and L is the length of the pipe in 100 feet units.

By transportation we have $$\frac{H^{\frac{1}{2}}}{L^{\frac{1}{2}}} \times \frac{1^{\frac{1}{2}}}{S^{\frac{1}{2}}} = \frac{Q}{K_1} \quad (7)$$

and $$K_1 = 340 d^{\frac{5}{2}} \div (1+\frac{3.6}{D}+0.03d)^{\frac{1}{2}} \quad (8)$$

By comparing Equation (8) with Equation (3) we see that $K_1=5.18$ K approximately and we can substitute K for $K_1$ in Equation 7 as follows:

$$\frac{H^{\frac{1}{2}}}{L^{\frac{1}{2}}} \times \frac{(5.18^2)^{\frac{1}{2}}}{S^{\frac{1}{2}}} = \frac{Q}{K} \quad (9)$$

Reducing Equation (9) to logarithms we have

1/2 log. H − 1/2 log. L + 1/2 log. 26.7 − 1/2 log. S + log. K − log. Q = 0    (10)

The difference between Equation (10) and Equation (5) is that 1/2 log. A in the latter is substituted by 1/2 log. 26.7 which has to be used in the low pressure problems instead of the mean pressure in the high pressure problems. Since the zero on the mean gage pressure scale corresponds to 14.7, as explained above, therefore the number 26.7 corresponds to the 12 pounds mark on the mean gage pressure scale. Accordingly the arrowhead, called gravity mark, is noted at the location of the 12 pound mark to be used in connection with low pressure problems instead of the mean gage pressure in high pressure problems.

Steam and water problems were treated in the same manner on the opposite face of the slides. The equation was first derived algebraically for water; it reads, $$Q = 5 \cdot \left( \frac{H d^5}{L(1 + \frac{3.6}{d} + 0.03d)} \right)^{\frac{1}{2}} \quad (11)$$

where Q is the quantity discharged in gallons per minute; H is the loss of head in friction, feet of water; $d$ is the inside diameter of the pipe in inches and L is the length of the pipe in 100 feet units.

By transportation:

$$\frac{H^{\frac{1}{2}}}{L^{\frac{1}{2}}} = \frac{Q}{K_2} \quad (12)$$

and $$K_2 = 5 d^{5/2} \div (1 + \frac{3.6}{d} + 0.03d)^{\frac{1}{2}} \quad (13)$$

By comparing Equation (13) with (3) we see that $$K_2 = \frac{K}{12.86},$$

and we can write Equation (13) reduced to logarithms $$1/2 \log. H - 1/2 \log. L + (\log. K - \log. 12.86) - \log. Q = 0 \quad (14)$$

from which we deduce that the scales for H, L and Q are identically the same as on the face for gas and air, only the scale of K representing the diameters is spaced by a constant difference from the gas and air scale, the difference being equal to the logarithm of 12.86 which is equal to 1.1092 in logarithmic units. In these problems the middle scales are not used; the slides are shifted simultaneously, while the number of integer places in the quantity is also indicated by the heavy type figures corresponding to the rows of diameters, the figures being determined by the relation of Equations (12) and (14) which can easily be accomplished by solving the equations for one case in the usual algebraic way as illustrated above.

The equation showing the fundamental relation of the quantities for the flow of steam reads $$W = 8 \left( \frac{P Y d^5}{L(1 + \frac{3.6}{d} + 0.03d)} \right)^{\frac{1}{2}} \quad (15)$$

In which W is the weight of steam discharged through the pipe in pounds per minute, P is the pressure drop in pounds, Y is the density of the steam in pounds per cubic feet at the mean pressure, $d$ is the diameter of the pipe in inches, and L is the length of the pipe in 100 feet units.

By transportation we have $$\frac{P^{\frac{1}{2}}}{L^{\frac{1}{2}}} \times \frac{Y^{\frac{1}{2}}}{1^{\frac{1}{2}}} = \frac{W}{K_3} \quad (16)$$

and $$K_3 = 8 d^{5/2} \div (1 + \frac{3.6}{d} + 0.03d)^{\frac{1}{2}} \quad (17)$$

By comparing Equation (17) with Equation (13) we see that $K_3 = 1.6 K_2$ and we can write Equation (17) reduced to logarithms.

$$1/2 \log. P - 1/2 \log. L + 1/2 \log. Y - \log. 0.625 + \log. K_2 - \log. W = 0 \quad (18)$$

From Equation (18) it follows that P, L, $K_2$ and W are identical in numerical value with H, L, $K_2$ and Q of Equation (14). Of the other two terms, 1/2 log. Y was provided with a scale on the lower edge of the length slide reading in pounds of the mean gage pressure of the steam. The graduations, however, are laid out according to the logarithm of the density of the steam corresponding to the pressure marked on the scale. For instance, at zero pressure the density of the steam is 0.03733 pounds per cubic foot and the logarithm of this quantity is 8.57206-10. The mantissa of this logarithm, .57206 multiplied by the base (5 inches) gives 2.86029 inches as the position of the zero pressure mark from the end mark of the scale where the 5 inch base begins.

To complete Equation (18) the fourth term having the constant value of log. 0.625 (requiring the 10 inch base) which has a mantissa of .79588 was marked off on the corresponding position 7.9588 inches from the left end mark of the log scale on the upper edge of the diameter slide. This point was noted as the "pressure mark" which engages with the mean gage pressure scale in problems involving flow of steam in pipes. By comparing Equation (18) with Equation (14) it will be noted that the addition of the middle two terms in Equation (18) did not alter the ratio of the last two terms which enabled the heavy type columns to indicate the decimal point for the steam problems in the same manner as for the water problems. In addition to this it may be said that the scales of the slide rule are marked off by a dividing engine which is set for each mark according to tables reading in inches and prepared for each scale by multiplying the logarithm of the corresponding term by the base of the scale.

A casing is provided for the slide rule comprising a stiff back portion 7 secured to the base 1 of the slide rule by snap buttons 8 or other suitable means. Extending from the stiff back portion 7 are flaps 9 and 10 which fold over the slide rule and form a complete covering for it and for a rider 11 carried thereby. On the inside of the flaps they are preferably provided with directions for operating the rule and with other desirable information.

The rider 11 preferably consists of a single piece of transparent material such, for example, as celluloid, bent over at the ends 12 to engage lateral notches 13, so that the rider may slide freely along the rule, being provided, however, with a spring 14 for holding the rider firmly in position from which it can be removed by sliding it off the end of the rule.

In the calculations for gas or air the specific gravity scale is used on the basis of air equals 1.00.

Besides the regular slide rule computations, which are accomplished in the ordinary way by moving the two slides simultaneously with the scales B and C registering, this rule is designed and adapted to be used in the following classes of cases: Class A, problems involving the flow of gas in low pressure mains, and service pipes; also the flow of air in pipes close to atmospheric conditions. Class B, problems involving the flow of gas in high pressure mains and the flow of compressed air in pipes. Class C, problems involving the flow of steam in pipes. Class D, problems involving the flow of water in pipes. Class E, the problem of finding the number of smaller pipes equivalent in carrying capacity to one pipe of larger size, and the finding of the length of a larger sized pipe that will take the same drop when discharging the same quantity as a given length of a smaller sized pipe. Although these are the main classes of cases to which the present rule is applicable, it is obvious that various other problems may be solved by the use of this rule, and that the problems solved in any particular class may be solved for any unknown having given the proper information as to the other quantities.

In determining the number of integer places in the numerical quantity representing the discharge which is readable on the lower scale D, the diameter slide 5 is provided with horizontal graduations previously referred to, upon which are plotted in succession in the various horizontal graduations the sizes of pipes corresponding to the numerical quantities represented on the scale C. These horizontal graduations are designated by three rows of heavy type figures, one row in the center and one row at each end of the scale. For reading the discharge the numerical quantity corresponding to a certain graduation of the scale is read and the decimal point is determined by referring to the horizontal graduation in which the corresponding numeral appears on the horizontal device. If the diameter slide has not been changed end for end in either direction the number of integer places is read from the center row of heavy type figures, but if it is necessary to shift the slide end for end in either direction the number of integer places is read from the row of heavy type figures at that end of the slide which is held within the base, the other end of the slide being shifted beyond the base. It should be noted that these figures increase from left to right. Since all the values in this rule are plotted to a logarithmic scale the values which are read from any scale are the numerical values and constitute the mantissa of which the heavy type numerals in the horizontal graduations on the diameter slide are the characteristics. In other words, the horizontal graduations on the diameter slide take care of the decimal point and indicate directly the number of positive integers in the answer as read from a scale with which the extensions of the plotted numerals on the diameter slide register. It is necessary only to state that the sizes of the diameters recorded on the diameter slide were determined only after years of experimental work combined with a careful study of the subject of the flow of fluids in pipes.

In order that the operation of this device may be more readily understood, the solution of a number of problems is given hereafter with figures illustrating the settings of the rule to correspond therewith.

*Example 1.*—Find the discharge of gas in cubic feet per hour of an 8" pipe with a drop of 5" of water over a length of 5,000 feet, the specific gravity of the gas being 0.70.

Note.—For short distances with a number of bends in the line add to the actual length of the pipe the equivalent length of the 1 nds, as given in a table usually disposed on the inside cover of the rule, and take the total equivalent of pipe and bends in feet. First: Move the length slide until the given length, 5,000 feet, divided by 100, (as directed on the length slide) is under the drop 5 (see Fig. 4) on the drop scale A. Second, move the diameter slide until the given specific gravity 0.70 is set to the gravity mark on the main gage pressure scale. Third, locate on the diameter slide the vertical line mark for the given diameter and if this line should be on the projecting part of the scale, shift the slide end for end, setting the end mark which projected to the position of the other end. In this case, however, under the 8" diameter line the number 1.74 is read on the discharge scale D. Fourth, in the middle heavy type column on the diameter slide—since the slide was not moved end for end—find the figure 5 in the horizontal row on which the 8" diameter is marked. The answer is 17400 (five integer places) cubic feet per hour.

Example 2, Case C—Flow of steam—To find the drop of pressure.—Find the drop of pressure in a 3" pipe delivering 150 pounds of steam per minute over a length of 100 feet having 10 right angle bends in the line, mean pressure to be 10 pounds gage.

Note.—The 10 right angle bends each have an equivalent length of 9.3 feet so that the total equivalent length should be taken as 193 feet. First, referring to Fig. 5 and with the steam and water faces of the slides uppermost, set the 3" diameter line on the diameter slide to 150 on the discharge scale. Second, move the length slide until the 70 pounds mean gage pressure is set to the pressure mark on the diameter slide. Third, note that the 1.93 (193 divided by 100) mark on the length slide is out of scale. This necessitates shifting the length slide end for end to the position shown by Fig. 6. The hair line of the rider is placed at the right hand end of the length slide and it is shifted end for end in the well known manner. Fourth, over 1.93 on the length scale read on the drop of pressure scale 29.3 pounds, which is the required answer.

Example 3, class E—To find the length of a 24" pipe equivalent to three miles of 16" pipe.—Referring to Fig. 7: First, set the 16" diameter mark of the diameter scale to the right end mark of the discharge scale D. Second, move the length slide until the left end mark is opposite the 24" diameter mark of the diameter scale. Third, read on the drop scale A over the three mile length graduation on scale B the number 20.8.

Note that there is one horizontal line between the 24" diameter mark on the diameter scale, but as the right end mark of scale D was used at the start the horizontal graduation is neglected and no places are added to the final reading. The answer therefore is 20.8 miles of 24" pipe will take the same drop as three miles of 16" pipe.

It is obvious that a great number of problems can be solved directly by the use of this calculating device and that it is unnecessary to give all the cases or the solution for all the different problems.

What I claim is:

1. In a calculating device for the solution of problems involving the flow of fluid in the pipes, and comprising the ordinary slide rule scales, the combination of a slide therefor comprising a plurality of horizontal graduations indicating successive logarithmic characteristics of respective quantities as referred to the scale on the slide.

2. In a calculating device for the solution of problems involving the flow of fluid in circular pipes, the combination with the ordinary slide rule scales, of a slide comprising a plurality of horizontal graduations with diameters indicated thereon in order on the several horizontal graduations.

3. In a slide rule for the solution of problems involving the flow of a fluid in circular pipes, the combination with ordinary slide rule scales and a movable slide, of horizontal diameter graduations on the movable slide upon which are indicated in succession the diameters of pipes with indicator lines leading to the scale at the edge of the slide which correspond therewith.

4. In a slide rule for the solution of problems involving the flow of fluid in circular pipes, the combination with the ordinary slide rule scales, of another scale consisting of horizontal and transverse graduations arranged in succession with the rows indicated by numerals in direct succession, and having lines leading to one of the ordinary slide rule scales corresponding therewith.

5. In a calculating device for the solution of problems involving the flow of fluid in pipes, the combination of the ordinary slide rule scales, one graduated to indicate the drop of pressure and another graduated to indicate the discharge of fluid, a graduated pipe length slide, and a graduated pipe diameter slide, the said slides each being provided with one of the ordinary slide rule scales and being movable both with respect to each other and to the other slide rule scales.

6. In a slide rule for the solution of problems involving the flow of fluid in pipes, the combination of ordinary slide rule scales graduated to indicate the pressure drop, the fluid discharge, the length of pipe, the pipe diameters, and two additional scales adjust able with respect to each other but each fixed and having a definite relation with respect to one of the other scales, one of said additional scales indicating the mean gage pressure and the other specific gravity.

7. In a calculating device for the solution of problems involving the flow of fluid in circular pipes, the combination with ordinary slide rule scales, one of which indicates the pressure drop and another indicates the fluid discharge, of two slides movable relatively to each other and to the said scales, one of the slides being provided with a scale adjacent the pressure drop scale for indicating the pipe lengths and the other slide being provided with graduations adjacent the discharge scale indicating the pipe diameters and the said slides being provided one with a mean gage pressure scale and the other with a specific gravity scale adjacent each other and adapted to be adjusted with respect to each other.

8. In a calculating device, the combination with the ordinary slide rule scales, of another scale having a series of graduations with characters in the graduations leading to one of the ordinary slide rule scales, and numerical designations for the said graduations to indicate the number of positive integer places of any number referred to the scale.

9. In a calculating device, the combination with a slide rule having the ordinary slide rule scales, of another scale referred to one of the slide rule scales having a series of graduations with characters in the graduations leading to the slide rule scale, and numerical designations in the said graduations to indicate the logarithmic characteristic of which the numerical value on the scale corresponding thereto is the mantissa.

10. In a calculating device, the combination with a slide rule having the ordinary slide rule scales, of another scale referred to one of the slide rule scales having parallel and transverse graduations with characters in the graduations leading to the slide rule scale, different numerical designations for the parallel graduations at the ends and intermediate the ends thereof to indicate the logarithmic characteristic for the numerical value on the scale and to indicate the changed logarithmic characteristic when the slide is placed end for end.

11. In a slide rule, the combination with the ordinary slide rule scales A, B, C and D, of a double slide having additional graduations and independently movable with respect to each other and to the fixed scales for the direct solution of problems involving the flow of fluid in circular pipes.

In testimony whereof I have signed my name to this specification, in the presence of two subscribing witnesses, on this 23rd day of June, A. D. 1914.

JACOB M. SPITZGLASS.

Witnesses:
CHARLES H. SEEM,
KENT W. WONNELL.